Dec. 25, 1962
E. K. KOPPELMANN
3,069,750
SETTING DEVICE FOR ROLLER BURNISHING TOOLS
Filed Feb. 27, 1959
2 Sheets-Sheet 1
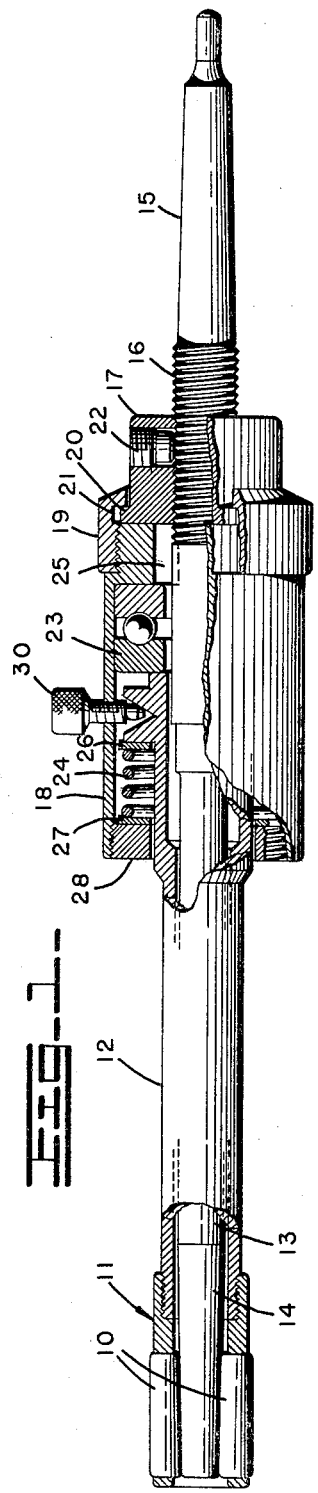
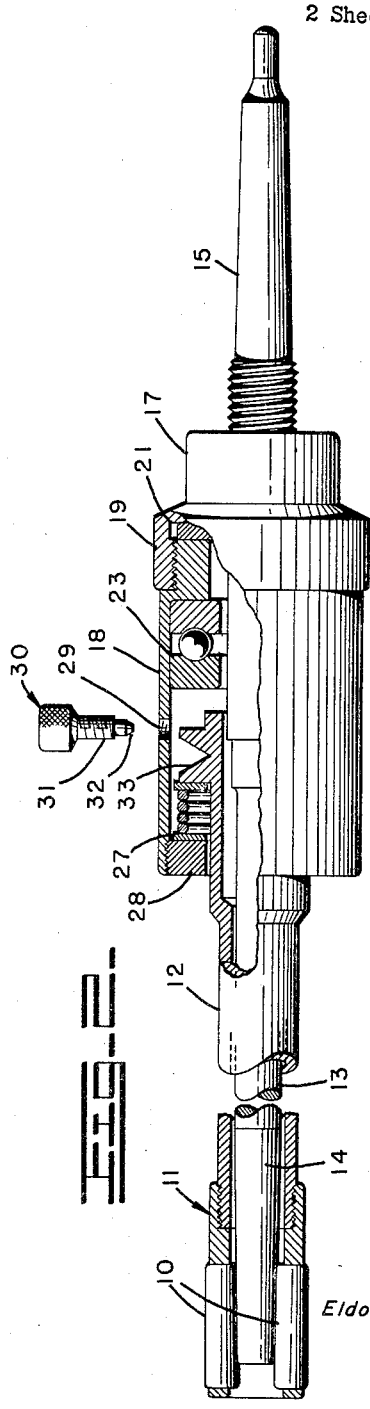
Eldo K. Koppelmann
INVENTOR.
BY Dec. 25, 1962  E. K. KOPPELMANN  3,069,750
SETTING DEVICE FOR ROLLER BURNISHING TOOLS
Filed Feb. 27, 1959  2 Sheets-Sheet 2
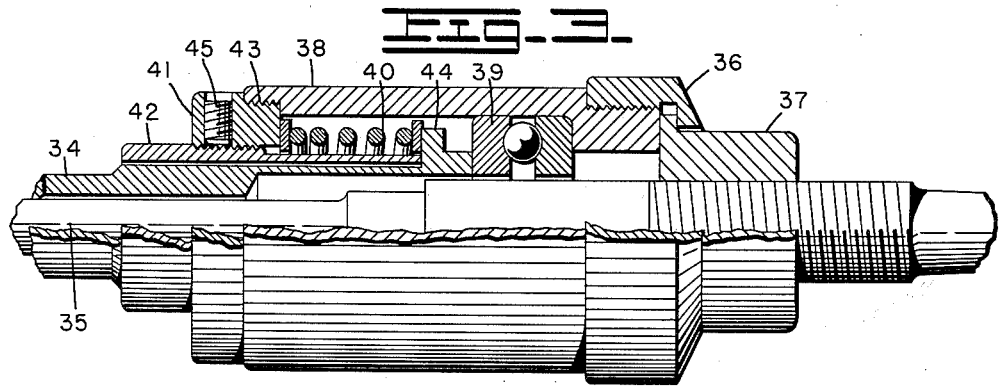
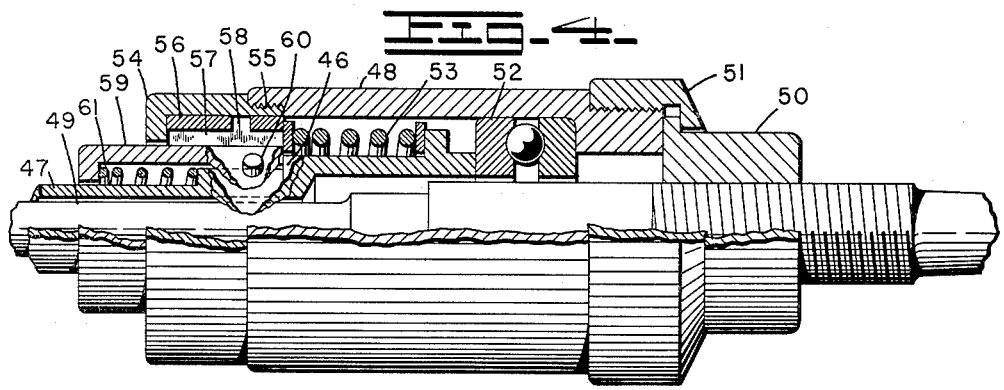
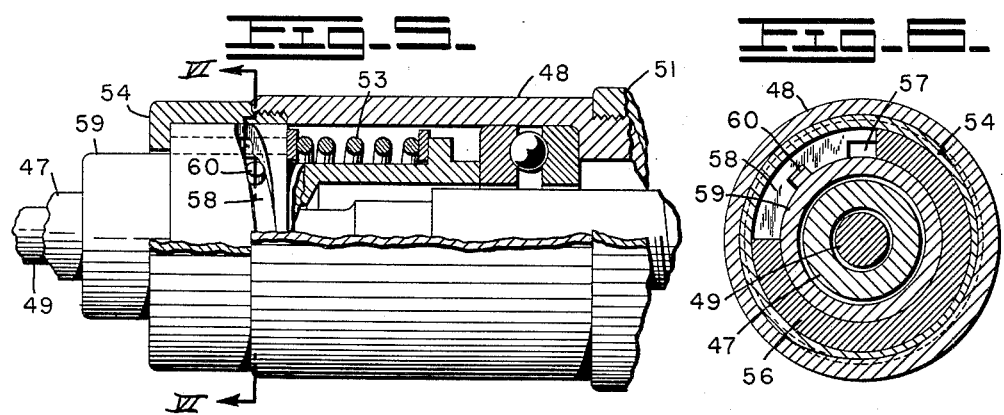
*Eldo K. Koppelmann*
INVENTOR.

United States Patent Office 3,069,750
Patented Dec. 25, 1962

3,069,750
SETTING DEVICE FOR ROLLER BURNISHING TOOLS
Eldo K. Koppelmann, 1012 E. Carpenter St., Moberly, Mo.
Filed Feb. 27, 1959, Ser. No. 796,015
4 Claims. (Cl. 29—90)

This invention relates to the construction of roller burnishing tools. These devices are used for the accurate sizing of inside and outside diameters, and also for the development of certain finish characteristics. In principle, the operation of these tools involves the processing of the workpiece with a group of rollers moving in a planetary path, and driven against the workpiece under great pressure. In the processing of inside diameter surfaces, this pressure is developed by causing the rollers to operate in conjunction with a central mandrel. Tools adapted to operate on outside diameters obtain the necessary roller pressure by a rigid sleeve which surrounds and confines the rollers. It is conventional to use tapered rollers operating against a tapered mandrel or sleeve, with the angularity of the resulting conical surfaces being of a complementary nature so that the rollers themselves operate on a substantially cylindrical surface.

It is well-known that the axes of the pressure rollers can be skewed somewhat with respect to a plane through the axis of the tool, which will result in causing the rollers to follow a helical path and create a self-feeding characteristic. The tool needs only to be engaged with the surface being processed, and the rotation of it with respect to the tool will draw the tool along its stroke of movement. The feeding movement of the rollers with respect to the workpiece generates a tendency for the rollers to also move axially with respect to the pressure member, and the direction of taper is such as to carry the rollers to a limit position of maximum engagement with the workpiece. This position is fixed by an adjustable stop which serves to determine the operating diameter of the tool. The rollers are positioned peripherally and axially by a cage, and it is convenient to refer to the behavior of a cage to facilitate an understanding of the relative movement of the rollers to the workpiece, and also the rollers with respect to the pressure member which holds them against the workpiece. The adjustable stop for establishing the operating diameter acts to block the axial movement of the cage with respect to the pressure member at a selected point, resulting in a definite placement of the rollers along the conical surface of the pressure member.

When the pressure member is restrained in its axial movement with respect to the workpiece, the rollers are no longer able to execute their natural tendency to climb on the pressure member to the limit position. A certain degree of slippage will take place between the rollers and pressure member as the rollers continue to move along their helical path on the workpiece as a result of the frictional forces encountered in the engagement with the workpiece itself. The moment the axial movement of the pressure member is arrested, the rollers will then be moved to a release position on the pressure member and to a position of decreased engagement with the workpiece.

This condition has resulted in a troublesome problem in connection with setting the operating diameter of the tools. If it is desired to set a tool for a particular diameter by adjusting the limit position of the rollers on the pressure member, it has been the usual procedure to engage the tool with a known diameter and adjust it until this diameter is met by the tool with the necessary operating pressure. The difficulty with this procedure is simply that the engagement with the workpiece and the adjustment of the tool to create the necessary operating pressure takes place with the tool in what amounts to a release condition. The arrested axial movement of the pressure member during the adjustment causes the tool to continually remain in a condition in which the rollers have moved in a direction to decrease the operating diameter. As soon as the tool is withdrawn after the trial, the rollers are free to assume the limit position of maximum engagement with the workpiece, which frequently results in overstraining the tool as a result of a greater engagement with the workpiece.

Applicant has found that this situation can be relieved by temporarily arresting the possibility of any relative axial movement between the roller cage and the pressure member so that the rollers are no longer free to move along the conical pressure surface toward a release position during the sizing trial. With this provision, it is possible to place the tool in engagement with a gage piece, and adjust it directly to the proper size without worry of subsequent deviation from the selected diameter. The several features of the invention will be discussed in detail through an analysis of the particular embodiment illustrated in the accompanying drawing.

In the drawing:
FIGURE 1 shows a side elevation, partially in section, of a roller burnishing tool adapted to operate on inside diameters, and showing the position of the device for setting the operating diameter.
FIGURE 2 is a view in partial section showing the condition of the tool moved to the normal releasing position without restraint imposed by the locking device provided by this invention.
FIGURE 3 is an elevation, partially in section, of a modified form of the invention.
FIGURE 4 is a view, partially in section, of a further modification of the invention.
FIGURE 5 is a view similar to that of FIGURE 4, but with the section planes selected to show certain of the components not appearing in FIGURE 4.
FIGURE 6 is a section taken on the plane VI—VI of FIGURE 5.

Referring to FIGURES 1 and 2 of the drawings, the illustrated roller burnishing tool includes a group of rollers 10 which are positioned axially and peripherally by the cage member 11 having the tubular extension 12. A mandrel 13 has a conical surface 14 which engages the conical rollers 10 in complementary fashion so that the outer operating diameter generated by the rollers is substantially cylindrical. The tapered surface 14 can be moved axially with respect to the rollers 10, with the obvious result of increasing or decreasing the circumscribed diameter operated upon by the rollers. The mandrel 13 is preferably continuous throughout the length of the tool, and terminates at the opposite end in the tapered surface 15 which is received in a suitable holder of a machine.

The threaded area 16 on the mandrel positions a nut 17, and this nut controls the axial position of the housing 18 with the aid of the coupling ring 19. The coupling ring is engaged with the housing by conventional threads, and is normally fixed with respect to the housing. The nut 17, however, is free to rotate with respect to the housing, the axial restraint being developed by the retention of the shoulder 20 within the recess 21 of the coupling ring 19. Rotation of the nut 17 with respect to the mandrel 13 will therefore result in the axial movement of the nut, and corresponding axial movement of the housing 18. The set screw 22 can be used to lock the position of the nut 17 with respect to the mandrel.

The effect of the axial movement of the housing 18 with respect to the mandrel 13 is to move the thrust bearing 23, which limits the movement of the cage member 11 in an axial direction to the right with respect to the housing 18 and consequently with respect to the mandrel 13. The thrust bearing therefore determines the limit position to which the rollers 10 are permitted to move in proceeding toward the larger diameter of the tapered surface 14. The rollers are skewed very slightly with respect to a plane through the axis of the mandrel 13 to display a natural tendency to create a helical path of movement carrying the rollers toward the larger end of the tapered surface 14. The setting of the working diameter of the tool consists in establishing the position of the rollers along the tapered surface 14.

If the axial movement of the mandrel with respect to the workpiece is arrested, the helical path of movement of the rollers with respect to the workpiece will tend to carry their rollers toward the minor diameter of the tapered surface 14, and the cage member 11 will display an axial movement to the left with respect to the housing 18, accompanied by the compression of the spring 24 and a reduction of the operating diameter as the smaller portion of the mandrel is encountered by the rollers. During the entire operation, the housing is rotatively fixed with respect to the mandrel by the action of the key 25. The spring 24 is retained between the bearing washers 26 and 27, with the assembly being positioned by the retaining plug 28. FIGURE 2 illustrates the ultimate release position of the tool corresponding to the movement of the cage to the point where the burnishing pressure has been released sufficiently to permit the withdrawal of the tool without strain.

To remove the self-releasing tendency to permit a settling adjustment to be made accurately, this invention provides a locking arrangement for temporarily preventing the relative axial movement of the cage member in the housing which is inherent in the self-release operation described above. The housing 18 is provided with a threaded opening 29 in the preferred form of the invention, and a locking bolt 30 is provided which has a threaded portion 31 for engagement with the opening 29. An extension on the bolt 30 terminates in the conical surface 32 at the tip which engages the preferably V-shaped groove 33 near the end of the tubular extension 12 of the cage member 11. This groove is machined in a portion of the tubular extension of somewhat enlarged diameter, which has the dual function of providing material for the groove and also for engagement with the retaining ring 26. The axial position of the threaded opening 29 is preferably such as to cause the conical end 33 to engage the side of the groove 33 to urge the end of the cage member tightly into engagement with the bearing 23. This arrangement provides the most positive removal of axial displacement of the cage member with respect to the housing. The tool may be set to the desired operating circumscribed diameter around the rollers with the bolt 30 in the position shown in FIGURE 1. After the diameter has been properly set so that the rollers engage the test diameter with the necessary pressure, the bolt 30 can be removed as shown in FIGURE 2, which will permit the tool to follow its natural tendencies to move to release position on arresting the axial movement of the mandrel 13 with respect to the rollers 10. The device illustrated in the drawings is adapted for machining inside diameters, and the tool shown in my Patent No. 2,843,918, issued on July 22, 1958, illustrates a tool operating on similar principles, and adapted for machining outside diameters. The locking system described in claims herein can be incorporated in either type of tool, since the releasing movement operates on the same principles.

The modification of the invention shown in FIGURE 3 provides a different arrangement for generating the restraint of the axial movement of the tubular extension 34 with respect to the mandrel 35 during the setting operation. The structural details of the mandrel 35, together with those of the coupling ring 36, the adjusting nut 37, the housing 38, the thrust bearing 39, and the spring 40 are basically similar to those of the modification shown in FIGURES 1 and 2. In FIGURE 3, however, the ring 41 has a threaded inside diameter which receives a similarly threaded portion on the sleeve 42. The ring 41 is normally fixed with respect to the housing 38 through the engagement of the thread 43, but rotation of the sleeve 42 with respect to the ring 41 will cause relative axial movement which can eventually bring the right end of the sleeve 42 into engagement with the shoulder 44 of the tubular extension 34 of the cage unit. When such an engagement has been effected, the relative axial position of the cage member and the mandrel are locked. The set screw 45 can be incorporated to secure the desired position of the sleeve 42, whether in the locked position illustrated in FIGURE 3, or in a release position in which the sleeve 42 has been rotated to cause axial movement to the left and permit freedom of the cage member with respect to the housing and mandrel.

The modification shown in FIGURES 4, 5, and 6 utilizes a sleeve-shaped member which moves axially into a position to engage the shoulder 46 on the tubular extension 47 to prevent relative movement between the cage and the housing 48. As with the other modifications, the housing 48 may be considered as axially fixed with respect to the mandrel 49 through the action of the nut 50 and the ring 51. The thrust bearing 52 and the spring 53 function as previously discussed.

The ring 54 is normally fixed with respect to the housing 48 through the action of the threads 55, and has a collar 56 pressed firmly into engagement with the inside diameter so that the collar 56 and the ring 54 may be considered as fixed with respect to each other. The collar 54 has an internal axial keyway shown at 57 which communicates with a short section of helical groove 58. The locking sleeve 59 has a projecting stud 60 which engages the axial keyway 57 and the helical groove 58. The action of the spring 61 results in normally maintaining the locking sleeve 59 in a position to the left of that shown in FIGURES 4 and 5. Under these conditions the stud 60 is at the left extremity of the keyway 57. When it is desired to lock the cage with respect to the mandrel, the locking sleeve 59 can be pushed to the right against the action of the spring 61, and rotated after the stud 60 is in position to engage the hellical groove 58. Such rotation brings the right end of the locking sleeve 59 into engagement with the shoulder 46 on the tubular extension of the cage, and thereby prevents the axial movement normally associated with the releasing operations.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. An adjustable roller burnishing tool comprising a roller support member having an axially adjustable stop means fixed thereon and having a conical end portion, a housing member surrounding said supporting member and axially fixed normally to said stop means, a roller cage member containing a group of conical rollers, said cage member surrounding said support member with said conical rollers spaced around and in contact with said support member conical end portion, a portion of said cage member also being contained within said housing and having an annular groove on said cage portion, a locking member radially insertable in said housing and said annular groove having cooperating surfaces that extend at an angle to the axis of said support member, and said cage member being axially and rotatably movable with respect to said support member and said housing member.

2. An adjustable roller burnishing tool comprising a roller support member having an axially adjustable stop means fixed thereon and having a conical end portion, a housing member surrounding said supporting member and axially fixed normally to said stop means, a roller cage member containing a group of conical rollers, said cage member surrounding said support member with said conical rollers spaced around and in contact with said support member conical end portion, a portion of said cage member also being contained within said housing, and said cage member being axially and rotatably movable under operating conditions with respect to said support member and said housing member, and locking means axially adjustable with respect to said housing member and engageable with said cage member to prevent any axial movement of said cage member away from said stop means.

3. An adjustable roller burnishing tool comprising a roller support member having an axially adjustable stop means fixed thereon and having a conical end portion, a housing member surrounding said supporting member and axially fixed normally to said stop means, a roller cage member containing a group of conical rollers, said cage member surrounding said support member with said conical rollers spaced around and in contact with said support member conical end portion, a portion of said cage member also being contained within said housing, and said cage member being axially and rotatably movable under operating conditions with respect to said support member and said housing member, and locking means engageable with said cage member to prevent any axial movement of said cage member away from said stop means.

4. An adjustable roller burnishing tool comprising a roller support member having an axially adjustable stop means fixed thereon and having a conical end portion, a roller cage member containing a group of conical rollers normally engaging said conical end portion, said cage member being axially and rotatably movable under operating conditions with respect to said support member and said housing member, and locking means interposed between said cage member and stop means to prevent any axial movement of said cage member away from said stop means.

References Cited in the file of this patent

UNITED STATES PATENTS 2,045,787    Maupin _____ June 30, 1936

FOREIGN PATENTS 730,338    Great Britain _____ May 18, 1955